United States Patent
Takizawa et al.

[11] Patent Number: 6,143,222
[45] Date of Patent: *Nov. 7, 2000

[54] SURFACE FASTENER MANUFACTURING METHOD

[75] Inventors: Toshiaki Takizawa; Ryuichi Murasaki, both of Toyama-ken, Japan

[73] Assignee: YKK Corporation, Tokyo, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/701,252

[22] Filed: Aug. 21, 1996

Related U.S. Application Data

[63] Continuation of application No. 08/359,895, Dec. 20, 1994, abandoned.

[30] Foreign Application Priority Data

Dec. 28, 1993 [JP] Japan .................................. 5-337498

[51] Int. Cl.$^7$ ............................ B29C 47/32; B29C 47/02
[52] U.S. Cl. ..................... 264/167; 24/442; 264/173.1; 264/177.2; 425/115
[58] Field of Search ..................................... 264/167, 243, 264/166, 165, 173.1, 177.2; 425/325, 327, 115, 814; 156/244.12, 244.15; 24/442

[56] References Cited

U.S. PATENT DOCUMENTS

| | | | |
|---|---|---|---|
| 3,168,605 | 2/1965 | Ellegast et al. | 264/166 |
| 3,594,865 | 7/1971 | Erb | 425/115 |
| 3,608,035 | 9/1971 | Fröhlich | 264/166 |
| 3,758,657 | 9/1973 | Menzin et al. | 264/166 |
| 4,097,634 | 6/1978 | Bergh . | |
| 4,251,912 | 2/1981 | Yoshida | 425/814 |
| 4,769,202 | 9/1988 | Eroskey et al. | 264/116 |
| 4,872,243 | 10/1989 | Fischer | 264/167 |
| 4,999,067 | 3/1991 | Erb et al. | 264/166 |
| 5,260,015 | 11/1993 | Kennedy et al. | 264/243 |
| 5,393,475 | 2/1995 | Murasaki et al. | 264/167 |
| 5,441,687 | 8/1995 | Murasaki et al. | 264/167 |
| 5,620,769 | 4/1997 | Wessels et al. | 428/100 |
| 5,669,120 | 9/1997 | Wessels et al. | 24/446 |
| 5,702,797 | 12/1997 | Sakakibara et al. | 428/100 |
| 5,745,961 | 5/1998 | Okawa et al. | 24/446 |

FOREIGN PATENT DOCUMENTS

| | | |
|---|---|---|
| 0 580 073 A2 | 1/1994 | European Pat. Off. . |
| 56-056844 | 5/1981 | Japan . |
| 1150528 | 6/1990 | Japan . |
| 87 06522 | 5/1987 | WIPO . |
| WO87-06522 | 11/1987 | WIPO ................................. 264/166 |

*Primary Examiner*—Jan H. Silbaugh
*Assistant Examiner*—Mark Eashoo
*Attorney, Agent, or Firm*—Hill & Simpson

[57] ABSTRACT

Molten resin is continuously extruded from an extrusion nozzle having a selected width, and at the same time, a plurality of parallel fiber filaments are introduced straightly toward the molten resin outlet in a direction along rotation of a die wheel and/or traversing one or more filaments by a predetermined width. The molten resin extruded from the extrusion nozzle and the filaments are introduced into a predetermined gap for molding a plate-like substrate sheet between the nozzle and the die wheel, which has a multiplicity of hook-forming cavities in its circumferential surface and is rotatable in one direction, and at the same time, the hook-forming cavities are filled with a part of the molten resin. The filaments are embedded in the substrate sheet of the extruded molten resin as the die wheel is driven to rotate in the direction of extrusion of the molten resin, and a plurality of hooks are continuously molded on a surface of the substrate sheet.

12 Claims, 4 Drawing Sheets

SURFACE FASTENER MANUFACTURING METHOD

This is a continuation of application Ser. No. 08/359,895, filed Dec. 20, 1994, now abandoned.

BACKGROUND OF THE INVENTION

1. Field of the Invention

This invention relates to a method for continuously molding a surface fastener, which has a multiplicity of engaging members on a surface of a plate-like substrate sheet, by extruding thermoplastic resin.

2. Description of the Related Art

The technology of extruding a substrate sheet using thermoplastic resin and, at the same time, molding hooks on one surface of the substrate sheet is already known by, for example, WO87/06522. The molding method disclosed in this publication comprises extruding molten thermoplastic resin onto a circumferential surface of a drum-shape die wheel, in which a multiplicity of mold discs and a multiplicity of spacer plates are laminated alternately, filling the hook-forming cavities of the mold discs with the resin while pressing the resin on the drum surface to form a substrate sheet, and pulling molded hooks out of the cavities along with the substrate sheet in timed relation to the rotation of the drum while the resin is cooled. The mold disc has in one side surface hook-shape cavities extending radially from the circumferential surface toward the center and spaced circumferentially at predetermined distances. The side surfaces of the spacer plate are flat. The reason why the spacer plate is needed is that the cavities of the whole shape of the hook cannot be formed in a single mold.

According to the surface fastener manufacturing method disclosed in the above-mentioned publication, since the surface fastener is merely molded continuously of thermoplastic resin, it would be extended due to a tension exerted on the surface fastener when it is cut into pieces, thus causing dimensional errors in the products. Further, when the resulting surface fastener is attached to a garment by sewing, the surface fastener would have cracks due to the sewing needle so that it cannot be sewn to the garment.

With the foregoing problems in view, it is an object of this invention to provide a molding method for manufacturing a surface fastener effectively and simply which is free of extension though molded of thermoplastic resin by extrusion, is free from any crack during sewing and is stable in shape.

SUMMARY OF THE INVENTION

As the result of various studies made in order to accomplish the above object, the present inventors have considered to attach a cloth, which is woven of warp and weft yarns, to the back surface of the substrate sheet, or to embed the cloth in the substrate sheet, while the substrate sheet and hooks are molded integrally. In this case, however, assuming that the characteristic of the surface fastener may be changed according to the yarn density, it would be necessary to prepare various kinds of cloth having different densities. Additionally, since it is sometimes required to prevent the surface fastener only from being extended or only from being cracked, it is not always necessary to give to the surface fastener toughness in both warp and weft directions. Consequently it has turned out that using the cloth is disadvantageous from an economical view point and in that it might impair the characteristic of the surface fastener.

In other words, if the fiber filaments are used, it is possible to realize the optimum filament density simply by adjusting the number of filaments to be supplied and the speed of traverse, and it is possible to arrange the filaments either longitudinally or transversely easily. Accordingly it has turned out that using the fiber filaments is most advantageous. In order to mold the substrate sheet and the hooks integrally and to fuse the filaments of fiber material firmly with the substrate sheet, it is preferable to heat the filaments before joining to the substrate sheet. If the substrate sheet is adequately melted, it is not always necessary to preheat the filaments.

According to a first aspect of the invention, the foregoing problems can be solved by a method for continuously manufacturing a surface fastener, comprising the steps of continuously extruding molten resin from an extrusion nozzle having a selected width toward a peripheral surface of a die wheel having a plurality of engaging-member-forming cavities for molding a plate-like substrate sheet of a predetermined width, while filling said cavities with a part of said molten resin, continuously introducing a plurality of fiber filaments straightly and parallel onto said extruded molten resin and/or traversing one or more of said fiber filaments by a predetermined width, integrating said fiber filaments with said plate-like substrate sheet as said die wheel is driven to rotate in the direction of extrusion of said molten resin, and successively forming a plurality of engaging members integrally on a surface of said substrate sheet, and positively taking up said molded surface fastener after cooling by a suitable cooling means.

According to a second aspect of the invention, there is provided a method for continuously manufacturing a surface fastener, which comprises the steps of continuously extruding molten resin from an extrusion nozzle having a selected width, continuously introducing a plurality of fiber filaments straightly and parallel in a direction along rotation of a die wheel to an outlet of the extruded molten resin and/or traversing one or more of the fiber filaments by a predetermined width, introducing the molten resin extruded from the extrusion nozzle and the filaments into a predetermined gap for molding a plate-like substrate sheet between the nozzle and the die wheel, which has a multiplicity of hook-forming cavities in its circumferential surface and is rotatable in one direction, and at the same time, filling the engaging-member-forming cavities with a part of the molten resin, embedding the filaments in the substrate sheet of the extruded molten resin as the die wheel is driven to rotate in the direction of extrusion of the molten resin, successively forming a plurality of hooks integrally on a surface of the substrate sheet, and positively taking up the substrate sheet with the hooks molded thereon, after cooling by a suitable cooling means.

According to a third aspect of the invention, there is also provided a method for continuously manufacturing a surface fastener, which comprises the steps of continuously extruding molten resin from an extrusion nozzle having a selected width, introducing the molten resin into a predetermined gap for molding a plate-like substrate sheet between the nozzle and a die wheel, which has a multiplicity of hook-forming cavities in its circumferential surface and is rotatable in one direction, and at the same time, filling the engaging-member-forming cavities with a part of the molten resin, continuously introducing a plurality of parallel fiber filaments straightly onto a plate-like substrate sheet of the extruded molten resin, which sheet revolves along the rotation of the die wheel, and/or traversing one or more of the fiber filaments by a predetermined width, to thereby fixedly attach the fiber filaments to a surface of the substrate sheet, and positively taking up the substrate sheet with the hooks molded thereon, after cooling by a suitable cooling means.

More specifically, in manufacturing the surface fastener according to the first method, molten resin extruded from the extrusion nozzle is forced into a gap between the extrusion nozzle and the die wheel, and the hook-forming cavities are progressively filled with a part of the molten resin to mold the hooks and to continuously mold a plate-like substrate sheet having a predetermined thickness and a predetermined width. The molten resin in contact with the die wheel is guided around part of the circumferential surface of the die wheel by the guide roller, during which the molten resin is cooled from the inside of the die wheel to gradually become hard. During this hardening, as the substrate sheet is pulled by a suitable force in the direction of extrusion, the individual hooks are removed smoothly from the cavity as it elastically deforms into a straight form. Immediately after that, the individual hook restores its original shape and the resulting hook is gradually cooled to become hard.

Each of the filaments introduced to the vicinity to the outlet of the extrusion nozzle advances along the circumferential surface of the die wheel in the direction of rotation of the die wheel along the rotation of the die wheel while they are embedded in the molten resin. As a result, the filaments are embedded in and fused with the substrate sheet. The substrate sheet with the filaments and hooks integrally formed therewith are cooled into a half-hardened state from the inside of the die wheel and then are positively taken up. At a position immediately downstream of the die wheel, the surface fastener will be discharged as the surface of the substrate sheet is pressed by the guide roller.

In the resulting surface fastener, since a plurality of parallel straight filaments arranged longitudinally of the substrate sheet cross in the substrate sheet one or more filaments meandering as traversed, the surface fastener will not be extended under tension during cutting and will not be cracked during sewing.

DETAILED DESCRIPTION

Embodiments of this invention will now be described in detail with reference to the accompanying drawings.

Figure 1:
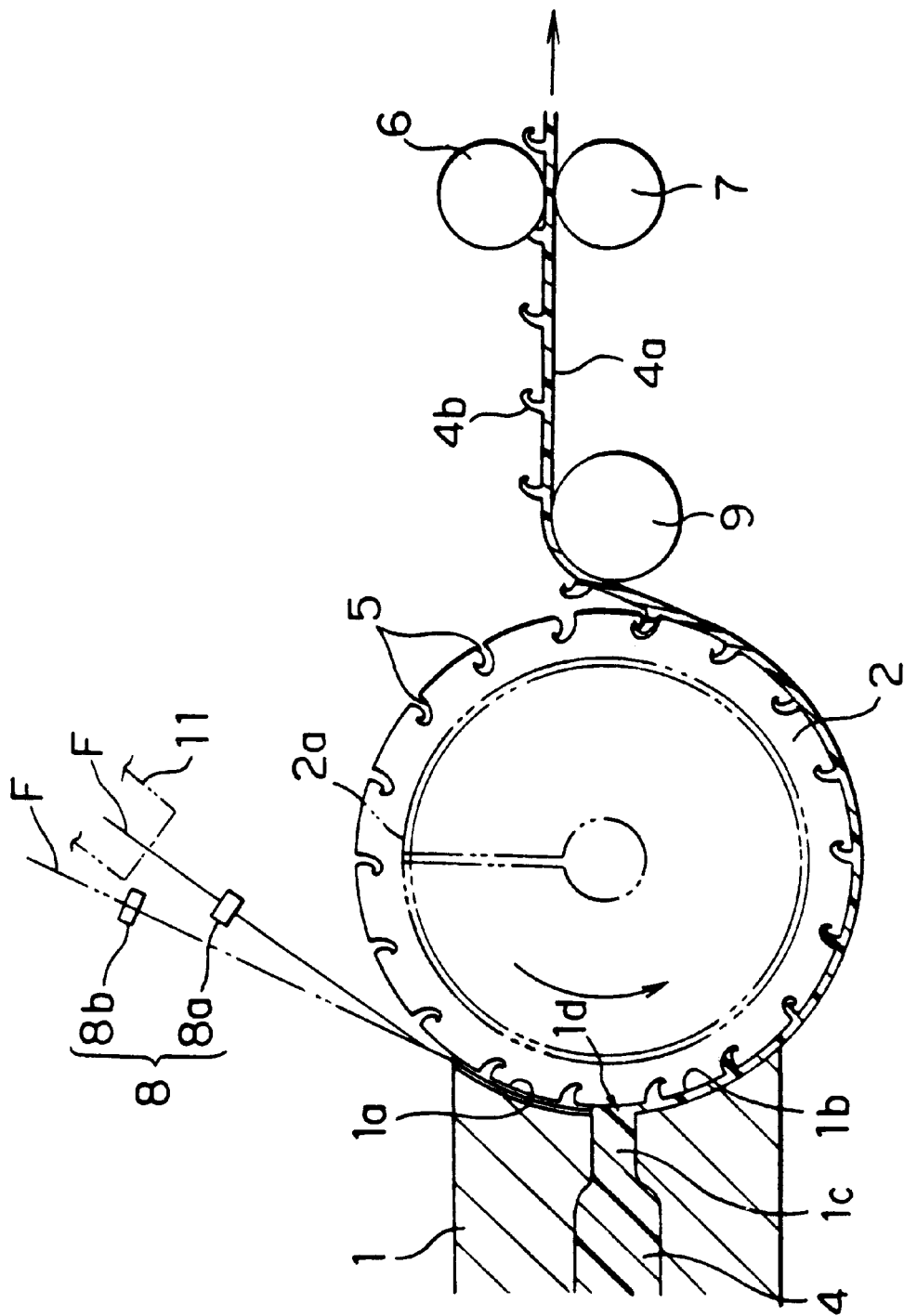
FIG. 1 is a fragmentary vertical cross-sectional view showing a molding apparatus for manufacturing a molded surface fastener, with backing of filaments, for carrying out a first embodiment of this invention.

FIG. 1 is a fragmentary vertical cross-sectional view showing a surface fastener, in which fiber filaments are fixed to the back surface of a substrate sheet longitudinally and transversely and engaging members are molded on the front surface of the substrate sheet, as manufactured on an apparatus according to a first embodiment of this invention. In the first embodiment and a second embodiment described later, the engaging members are hooks. However, the shape of the engaging members should by no means be limited to hooks but they may have different shape such as anchor etc.

In FIG. 1, reference numeral 1 designates an extrusion nozzle; the upper half of an end surface of the nozzle 1 is an arcuate surface 1a having a curvature virtually equal to that of a die wheel 2 described below, while the lower half end surface is an arcuate surface 1b having a predetermined gap between the arcuate surface 1b and a curved surface of the die wheel 2 for molding a plate-like substrate sheet 4a. The extrusion nozzle 1 is a T-type die, from an outlet 1d of which molten resin 4 is to be extruded in the form of a sheet. According to this embodiment, the extrusion nozzle 1 has a centrally extending passageway 1c.

The die wheel 2 is positioned in such a manner that part of its circumferential surface is close to the upper arcuate surface 1a and is spaced a predetermined gap from the lower arcuate surface 1b, and that its axis is parallel to the outlet 1d. The circumferential surface of the die wheel 2 has a multiplicity of hook-forming cavities 5. Since the structure of the die wheel 2 is substantially identical with the structure disclosed in WO87/06522, it is described here briefly. The die wheel 2 is in the form of a hollow drum having in it a water cooling jacket 2a. Centrally in the hollow drum, a multiplicity of ring-shape plates are laminated along the axis of the hollow drum. Each of every other ring-shape plates has in the front and back surfaces a multiplicity of hook-forming cavities 5 with the base of each hook opening to the circumferential surface of the drum. Both the front and back surfaces of each of non-illustrated ring-shape plates adjacent to the ring-shape plate having the hook-forming cavities 5 are flat. The die wheel 2 is rotatable, in a direction indicated by an arrow, as driven by a non-illustrated known drive unit.

Figure 5:
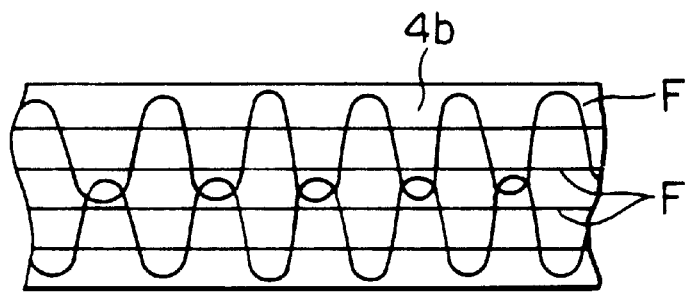
FIG. 5 is a plan view showing an example of arrangement of filaments according to this invention.
Figure 6:
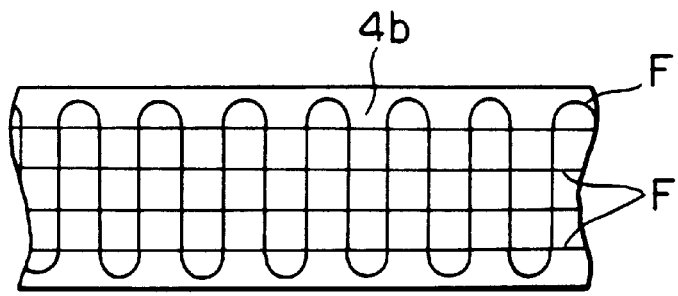
FIG. 6 is a plan view showing another example of arrangement of filaments.
Figure 7:
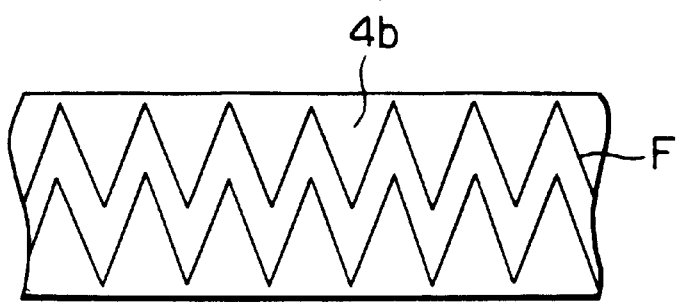
FIG. 7 is a plan view showing still another example of arrangement of filaments.

A plurality of fiber filaments F are introduced into the gap between the upper arcuate surface 1a and the circumferential surface of the die wheel 2 via a plurality of parallel filament guides 8 arranged transversely of the extrusion nozzle 1. As shown in FIG. 1, a first filament guide 8a indicated by solid lines is fixed to, for example, a non-illustrated frame and guides the filaments F straightly so as to feed them in the direction of rotation of the die wheel 2. A second filament guide 8b indicated by phantom lines in FIG. 1 is reciprocatingly moved by a predetermined width of traverse in a direction parallel to the axis of the die wheel 2 by a traverse device which is widely used in the field of textile machines. Accordingly the filaments F guided by the second filament guide 8b will be introduced into the gap between the upper arcuate surface 1a and the circumferential surface of the die wheel 2, meandering over a predetermined width of traverse. Likewise the first filament guides 8a, a plurality of second filament guides 8b are arranged parallel to one another and have each a desired width of traverse so that various composite meandering patterns can be obtained, by synchronous traverse, as shown in FIGS. 5 through 7. Further, by varying the traverse speed, it is possible to vary as desired the distance of the filaments arranged in the direction of rotation of the die wheel 2.

Further, in front (on the right side in FIG. 1) of the die wheel 2, a guide roller 9 is situated, and in front of the guide roller 9, a set of upper and lower discharge rollers 6, 7 is situated.

The resin material and the fiber filament material to be used in this invention are exemplified by thermoplastic resin such as nylon, polyester and polypropylene. The resin material and the filament material may be identical with or different from each other. During the molding, the molten resin temperature, extrusion pressure, die wheel temperature, speed of rotation of the die wheel, etc. should of course be controlled in accordance with the material used.

According to the apparatus constructed as mentioned above, molten resin 4 extruded from the extrusion nozzle 1 is forced into the gap between the extrusion nozzle 1 and the die wheel 2 in rotation, and a part of the extruded molten resin 4 is gradually charged in the hook-forming cavities 5 to mold hooks 4b and to continuously mold the plate-like substrate sheet 4a having a predetermined thickness and a predetermined width. The molded substrate sheet and hooks 4a, 4b are moved around substantially a half of the circumferential surface of the die wheel 2 as guided by the guide roller 9, during which they are cooled from the inside of the die wheel 2 to gradually become hard. During this hardening, when the molded substrate sheet 4a is pulled in the direction of extrusion by a suitable force, the individual hooks 4b are removed smoothly from the cavities 5 as they elastically deform into a straight form. Immediately after that, the hooks 4b restore their original shape and hence are gradually cooled to become hard.

Figure 3:
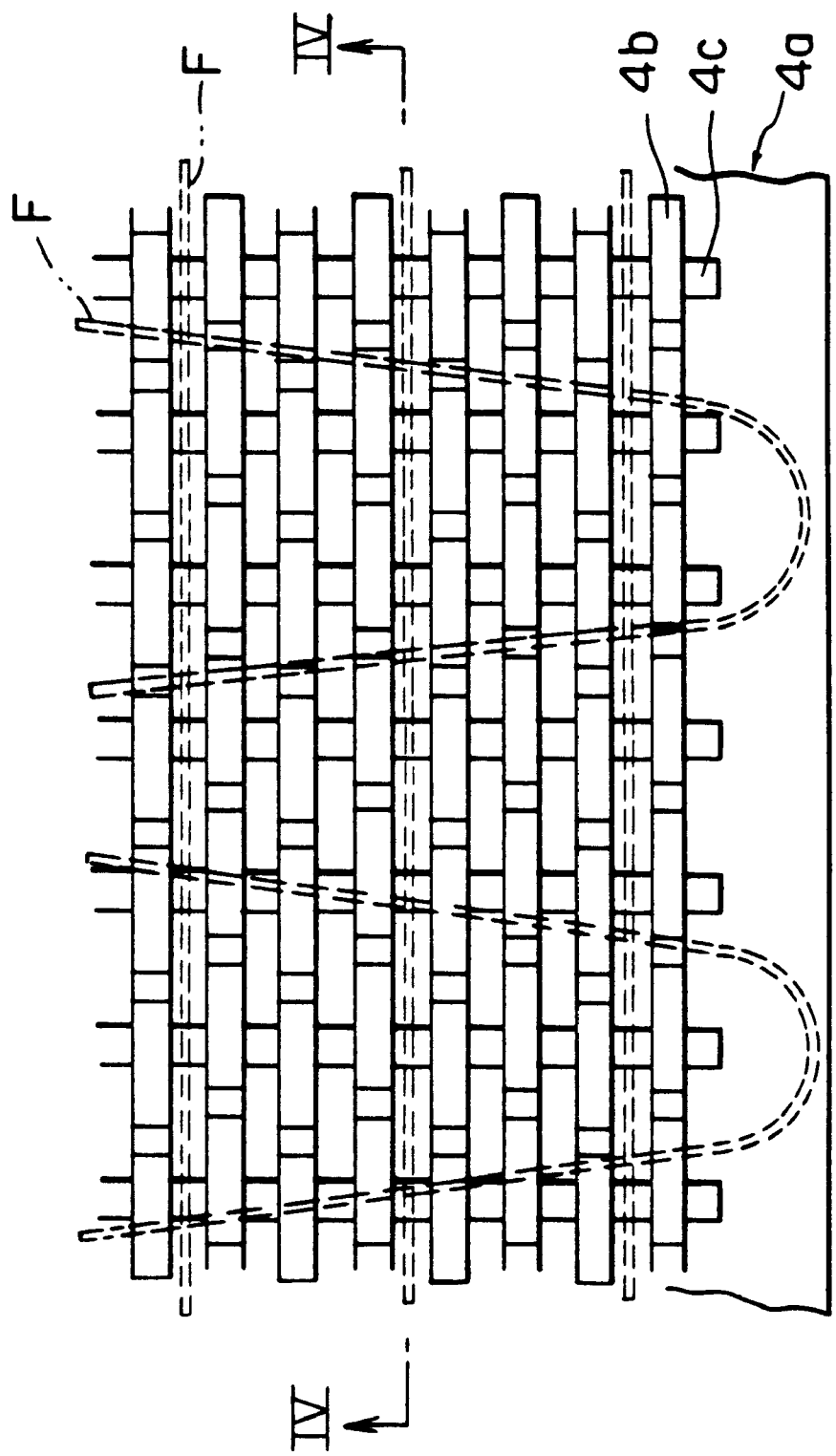
FIG. 3 is a fragmentary plan view showing an example of surface fastener manufactured according to the first embodiment.
Figure 4:
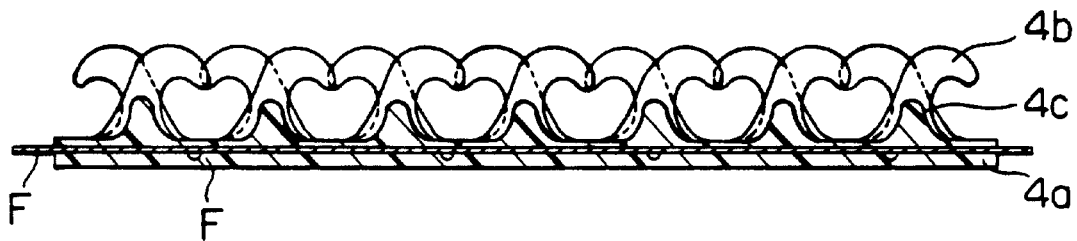
FIG. 4 is a cross-sectional view taken along line A—A of FIG. 3.

The individual filaments F introduced to the vicinity to the outlet 1b of the extrusion nozzle 1 advance along the circumferential surface of the die wheel 2 in the direction of rotation of the die wheel 2 along the rotation of the die wheel 2 while they are embedded in the molten resin. As a result, the filaments F are embedded in and fused with the substrate sheet 4a as shown in FIGS. 3 and 4. The substrate sheet 4a with the filaments F fused therewith and the hooks 4b are cooled into a half-hardened state from the inside of the die wheel 2 and then are positively taken up. At a position immediately downstream of the die wheel 2, the surface fastener is discharged as the surface of the substrate sheet 4a is pressed by the guide roller 9.

In this embodiment, in order to remove the resin molded product (surface fastener with backing of filaments) from the die wheel 2, a set of upper and lower discharge rollers 6, 7 rotatable in opposite directions in synchronism with each other is used. Although the circumferential surfaces of the discharge rollers 6, 7 may be smooth, it is preferable that they have grooves for receiving the rows of hooks 4b so that the hooks 4b are kept from being damaged. The rotating speed of the discharge rollers 6, 7 is determined to be slightly larger than the rotating speed of the die wheel 2 so that the hooks 4b can be removed smoothly from the hook-forming cavities 5.

In the resulting surface fastener, since a plurality of parallel straight filaments F arranged longitudinally of the substrate sheet 4a cross in the substrate sheet 4a one or more filaments F meandering as traversed, the surface fastener will not be extended under tension during cutting and will not be cracked during sewing.

Figure 2:
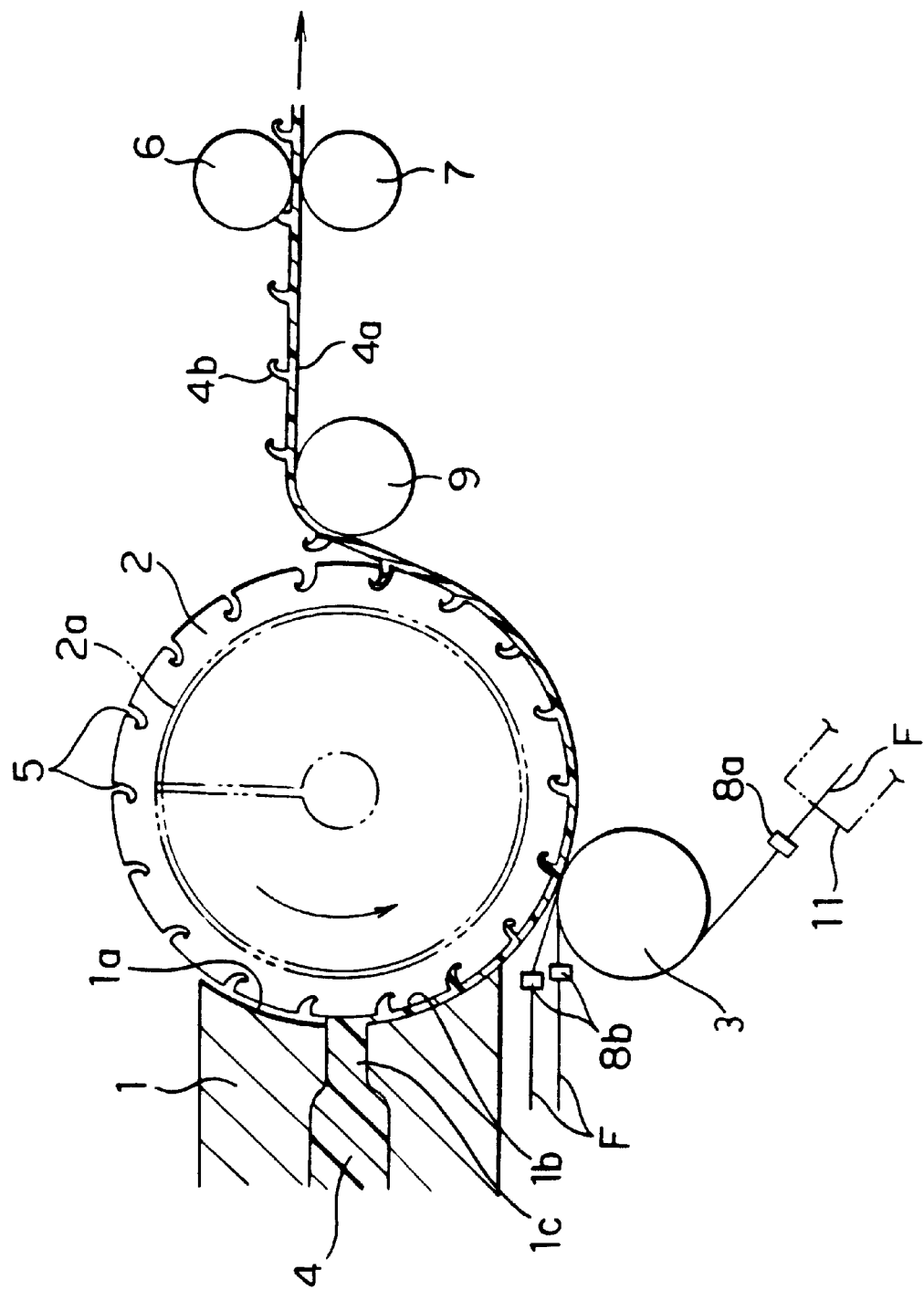
FIG. 2 is a fragmentary vertical cross-sectional view showing another molding apparatus for carrying out a second embodiment of the invention.

FIG. 2 shows an apparatus for manufacturing a surface fastener with backing of filaments according to a second embodiment, in which the filament guide section of the first embodiment is modified. In the second embodiment, parts or elements substantially identical with those of the first embodiment are designated by like reference numerals.

In FIG. 2, reference numeral 3 designates a filament pressure roller situated under the extrusion nozzle 1 so as to simultaneously press the molten resin and filaments F against part of the circumferential surface of the die wheel 2. The first filament guide 8a, which guides the filaments F straightly in the direction of rotation of the die wheel 2, is situated under the filament pressure roller 3. The first filament guide 8a guides the filaments F in such a manner that the filament F goes around part of the circumferential surface of the filament pressure roller 3 and then supplies them to the gap between the pressure roller 3 and the die wheel 2. The second filament guide 8b is situated immediately upstream side of the resin pressing point between the die wheel 2 and the pressure roller 3, and likewise the first embodiment, supplies the filaments F while traversing by a predetermined width of traverse in the direction parallel to the axis of the die wheel 2.

Therefore, in the second embodiment, the upper arcuate surface 1a of the nozzle 1 has a curvature virtually equal to that of the die wheel 2, while the lower arcuate surface 1b has a predetermined gap for molding the substrate sheet 4a between itself and the circumferential surface of the die wheel 2. The extrusion nozzle 1 is the T-type die having the passageway 1c with the outlet 1d in the boundary of the upper and lower arcuate surfaces 1a, 1b, from which outlet 1d molten resin 4 is to be extruded in the form of a sheet.

According to the second embodiment, the molten resin extruded from the extrusion nozzle 1 is introduced into the gap defined between the extrusion nozzle 1 and the die wheel 2 and then fills the hook-forming cavities 5, which are provided in the circumferential surface of the die wheel 2, gradually along the rotation of the die wheel 2. The molten resin on the die wheel 2 is moved around virtually a quarter of the circumferential surface of the die wheel 2 and then is removed from the die wheel 2, while being gradually cooled by a non-illustrated cooling device inside the die wheel 2.

During this molding, the filaments F are guided simultaneously by the first and second filament guides 8a, 8b and are then fused integrally with the surface of the substrate sheet 4a, which are formed on the circumferential surface of the die wheel 2, as the filaments F are pressed against the surface of the substrate sheet 4a. At that time, if the filaments F are heated previously, there should be no difference in temperature between the filament F and the half-molten high-temperature substrate sheet 4a, thus causing reliable fusing.

As mentioned above, in the surface fastener manufactured according to each of the foregoing embodiments, a multiplicity of hooks 4b are molded on the surface of the substrate sheet 4a, and the filaments F are arranged at desired distances longitudinally and transversely in the substrate sheet 4a as being fused with the substrate sheet 4a. However, this invention should be no means be limited to the foregoing embodiments, and it should not be necessary to arrange the filaments F in both the longitudinal and transverse directions, depending on the characteristic of the required surface fastener. A pair of traverse filaments F may be used as shown in FIG. 7, without arranging straight filaments F. Alternatively, only the straight filaments F may be arranged longitudinally of the substrate sheet 4a.

In the foregoing embodiments, as is apparent from FIGS. 3 and 4, a multiplicity of rows of hooks 4b are formed on the surface of the substrate sheet 4a and each of the hooks 4b has a pair of ribs 4c one on each of opposite side surfaces. In the same hook row, the hooks 4b are directed in a common direction, and in the adjacent hook rows, they are directed in mutually opposite directions. Although they may be omitted, the ribs 4c are effective in preventing the hooks 4b from falling flat. In this invention, in the same hook row, the adjacent hooks 4b may be directed in mutually opposite directions so that a surface fastener having no direction in coupling can be obtained. Various modifications may be suggested within the scope and concept of this invention.

As is explained above in detail, according to the molding method of this invention, various kinds of molded surface fasteners, in which filaments are arranged in the substrate sheet in various patterns can be continuously manufactured simply in a single process without requiring meticulous processes. The direction of engagement of the resulting surface fastener can be selectively secured among only longitudinal, only transverse and both, depending on the arrangement of the filaments. This surface fastener is excellent in dimensional precision and is free from being extended when it is cut into pieces in a subsequent step. Also in the sewing step, the surface fastener is free from any crack in the substrate sheet due to the sewing needle. Accordingly a durable and high-quality surface fastener can be obtained.

In the above-described embodiments, the molten resin is extruded toward the die wheel in a direction right-angled to the peripheral surface of the die wheel. Alternatively, the molten resin may be extruded between an upper die wheel and a lower press wheel both of which co-rotate in opposite directions.

What is claimed is:

1. A method for continuously manufacturing a surface fastener, comprising:
   (a) continuously extruding molten resin from an extrusion nozzle having a selected width toward a peripheral surface of a die wheel having a plurality of engaging-member-forming cavities for molding a plate shaped substrate sheet having a selected width, while filling said cavities with a part of said molten resin;
   (b) continuously introducing a plurality of individual, spaced apart, elongate, continuous fiber filaments into said extruded molten resin downstream of said extrusion nozzle;
   (c) integrating said fiber filaments with said plate shaped substrate sheet as said die wheel is driven to rotate in the direction of the extrusion of said molten resin, and successively forming a plurality of engaging members integrally on a surface of said substrate sheet; and
   (d) positively taking up said molded surface fastener after cooling by a suitable means, said fiber filaments preventing the surface fastener from being extended during cutting and/or from being cracked during sewing.

2. The method according to claim 1, wherein the step of introducing the fiber filaments is further defined in that the fiber filaments are introduced in a straight and parallel pattern.

3. The method according to claim 1, wherein the step of introducing the fiber filaments is further defined in that the fiber filaments are introduced in a traversing pattern across a selected width.

4. The method according to claim 1, wherein the step of introducing the fiber filaments is further claimed in that the fiber filaments are introduced with some fiber filaments running in a straight parallel pattern and respective other fiber filaments are introduced in a traversing pattern across a selected width.

5. A method for continuously manufacturing a surface fastener, comprising:
   (a) continuously extruding molten resin from an extrusion nozzle having a selected width;
   (b) continuously introducing a plurality of individual, spaced apart, elongate, continuous fiber filaments in a direction along rotation of a die wheel upstream of an outlet of said extruded molten resin;
   (c) introducing said molten resin extruded from said extrusion nozzle and said filaments into a predetermined gap for molding a plate shaped substrate sheet between said nozzle and the die wheel, which has a multiplicity of engaging-member-forming cavities in its circumferential surface and is rotatable in one direction, and at the same time, filling said engaging-member-forming cavities with a part of said molten resin;
   (d) embedding said filaments in said plate shaped substrate sheet of extruded molten resin as said die wheel is driven to rotate in the direction of extrusion of said molten resin, and successively forming a plurality of engaging members integrally on a surface of said substrate sheet; and
   (e) positively taking up said substrate sheet with said engaging members molded thereon, after cooling by a suitable cooling means, said fiber filaments preventing the surface fastener from being extended during cutting and/or from being cracked during sewing.

6. The method according to claim 5, wherein the step of introducing the fiber filaments is further defined in that the fiber filaments are introduced in a straight and parallel pattern.

7. The method according to claim 5, wherein the step of introducing the fiber filaments is further defined in that the fiber filaments are introduced in a traversing pattern across a selected width.

8. The method according to claim 5, wherein the step of introducing the fiber filaments is further claimed in that the fiber filaments are introduced with some fiber filaments running in a straight parallel pattern and respective other fiber filaments are introduced in a traversing pattern across a selected width.

9. A method for continuously manufacturing a surface fastener, comprising:
   (a) continuously extruding molten resin from an extrusion nozzle having a selected width;
   (b) introducing said molten resin into a predetermined gap for molding a plate shaped substrate sheet between said nozzle and a die wheel, which has a multiplicity of engaging-member-forming cavities in its circumferential surface and is rotatable in one direction, and at the same time, filling said engaging-member-forming cavities with a part of said molten resin;
   (c) continuously introducing a plurality of individual, elongate, continuous parallel spaced apart fiber filaments into said plate shaped substrate sheet of said extruded molten resin, which sheet revolves along the rotation of said die wheel, to thereby fixedly attach said fiber filaments to a surface of said substrate sheet; and
   (d) positively taking up said substrate sheet with the engaging members molded thereon, after cooling by a suitable cooling means, said fiber filaments preventing the surface fastener from being extending during cutting and/or from being cracked during sewing.

10. The method according to claim 9, wherein the step of introducing the fiber filaments is further defined in that the fiber filaments are introduced in a straight and parallel pattern.

11. The method according to claim 9, wherein the step of introducing the fiber filaments is further defined in that the fiber filaments are introduced in a traversing pattern across a selected width.

12. The method according to claim 9, wherein the step of introducing the fiber filaments is further claimed in that the fiber filaments are introduced with some fiber filaments running in a straight parallel pattern and respective other fiber filaments are introduced in a traversing pattern across a selected width.

* * * * *